(No Model.)

J. B. FOWLER.
NURSING NIPPLE.

No. 420,651. Patented Feb. 4, 1890.

Witnesses.
Henry North
M. B. Bishop.

Inventor.
Mrs. Jennie B. Fowler

UNITED STATES PATENT OFFICE.

JENNIE B. FOWLER, OF BRIDGEPORT, CONNECTICUT.

NURSING-NIPPLE.

SPECIFICATION forming part of Letters Patent No. 420,651, dated February 4, 1890.

Application filed August 9, 1889. Serial No. 320,322. (No model.)

*To all whom it may concern:*

Be it known that I, JENNIE B. FOWLER, residing at Bridgeport, Connecticut, and a citizen of said State, have invented a new and useful Improvement in Nursing-Nipples, of which the following is a specification.

The object of my invention is to secure a nursing-nipple in which the flow of the milk is under the control of the nurse or person administering the food and can be regulated to any desired rate, whether the child is nursing feebly or vigorously, and without removing the nipple from the child's mouth.

The moods of infants are variable, they being at times ravenous and taking milk so rapidly as to produce strangulation if it comes freely, or it will not properly mix with the secretions of the mouth and stomach, producing indigestion, colic, &c. On the other hand, the child may be feeble or sleepy and fail to eat at all if it does not come free, or it may be so long in taking its food that the milk becomes cooled below the proper temperature, or it may be irritated and refuse to eat at all if the nipple is taken from its mouth to exchange for another, thus endangering the health of the child and adding to the labor of caring for it; but with my improved nipple the milk can be regulated by the nurse to flow at a proper rate, whether the child is eager for its food or dainty and inclined to refuse it.

Figure 2:
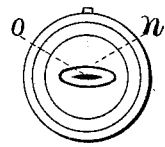
Figure 1:
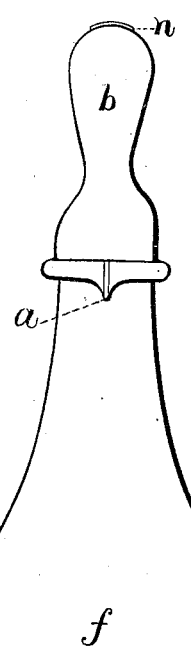

The construction of my improved nipple will be understood by reference to Figures 1 and 2. Fig. 1 represents a side elevation of my nipple $b$, provided on its collar with a projection $a$, which can be readily seen when it is light and whose position can be determined by the sense of feeling when it is dark. The delivery of the nipple is not a circular aperture, but an elongated orifice terminating in a point at each extremity, as shown at $o$, Fig. 2, which is a plan view, but its dimensions and the proportion of width to length are made greater or less when it is desired that the comparative flow of the milk shall be more or less free. The direction of its length is at right angles to a line extending from the center of the projection $a$ through the center of the delivery $o$. Surrounding this delivery is formed a strengthening-piece $n$ for the purpose of preventing the delivery from becoming ruptured or enlarged.

The general form of the nipple is shown at $b$, Fig. 1, being spherical on the outer extremity through which the delivery passes and of such thickness and elasticity that it will be compressed by the ordinary pressure of an infant's mouth in nursing.

Figure 5:
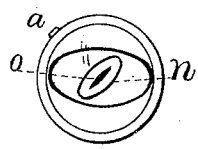
Figure 3:
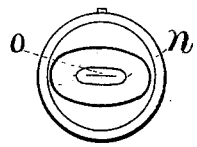
Figure 4:
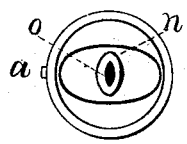

The operation of my invention is as follows: If the nipple be attached to a nursing-bottle containing milk by being drawn over its end, as shown by Fig. 1, and inserted in a child's mouth with the projection $a$ upward, the delivery will then be parallel with the child's mouth, and an attempt to nurse will partially compress the end of the nipple and the delivery will be effectually closed, so that no milk can issue, as shown by Fig. 3. If the nursing-bottle be turned ninety degrees, so as to bring the projection $a$ in a line with the child's mouth, as shown by Fig. 4, the delivery will then be at right angles to the child's mouth, and an attempt to nurse in that position will partially compress the nipple, which will cause the delivery to open to its utmost area, and a maximum flow of milk will result. If the nursing-bottle be turned forty-five degrees, so that the projection $a$ is half-way between the two positions above described, as shown by Fig. 5, the delivery will be half open, and a medium flow of milk will be the result. By varying the position of the projection $a$ through an arc of ninety degrees any required area of delivery and any required degree of flow can be secured, and without removing the nipple from the child's mouth, the area of the delivery and flow of milk being least when the direction of compression is at right angles to the delivery and greatest when it is parallel with the delivery.

If the child be nursing feebly, so that the flow of the milk is too slow, or if the bottle contain gruel or any other substance that obstructs the delivery, the bottle should be turned so that the projection $a$ will be brought downward in the direction of the child's mouth till the desired rate is obtained. If the child be nursing vigorously, so that the flow of the milk is too rapid, turn the bottle so that the projection $a$ will be brought upward or in the direction of the child's nose till the desired rate is secured.

I claim as my invention—

The combination of means herein described, consisting of the projection $a$, elastic nipple $b$, elongated delivery $o$, and nursing-bottle $f$, whereby the area of the delivery and flow of the milk are increased or decreased any desired degree, substantially as set forth.

JENNIE B. FOWLER.

Witnesses:
HENRY NORTH,
M. B. BISHOP.